(12) United States Patent
Penner et al.

(10) Patent No.: US 7,328,247 B2
(45) Date of Patent: Feb. 5, 2008

(54) SELF-CONTAINED INSTANT MESSAGING APPLIANCE

(75) Inventors: Christopher Penner, Madison, CT (US); Paul Alan Starbard, Guilford, CT (US); Robert Phan, Branford, CT (US); Michael Fawcett, Branford, CT (US)

(73) Assignee: Barracuda Networks, Inc., Campbell, CA (US)

( * ) Notice: Subject to any disclaimer, the term of this patent is extended or adjusted under 35 U.S.C. 154(b) by 402 days.

(21) Appl. No.: 10/878,794

(22) Filed: Jun. 28, 2004

(65) Prior Publication Data

US 2005/0050152 A1 Mar. 3, 2005

Related U.S. Application Data

(60) Provisional application No. 60/504,648, filed on Sep. 19, 2003, provisional application No. 60/482,663, filed on Jun. 26, 2003.

(51) Int. Cl.
*G06F 15/16* (2006.01)
(52) U.S. Cl. .................. 709/206; 709/218; 709/246
(58) Field of Classification Search ........ 709/203–207, 709/217–219, 246
See application file for complete search history.

(56) References Cited

U.S. PATENT DOCUMENTS

| | | |
|---|---|---|
| 2002/0087704 A1 | 7/2002 | Chesnais et al. |
| 2002/0118809 A1 | 8/2002 | Eisenberg |
| 2002/0122391 A1 | 9/2002 | Shalit ..................... 370/260 |
| 2003/0074410 A1 | 4/2003 | Kay et al. ................. 709/206 |

*Primary Examiner*—Abdullahi Salad
*Assistant Examiner*—Yasin M Barqadle
(74) *Attorney, Agent, or Firm*—Law Offices of Terry McHugh

(57) ABSTRACT

A system and method are presented for providing an instant messaging (IM) environment. The network includes a plurality of client computer processing systems, a plurality of public IM services and an IM server appliance coupling the client computer systems and the public IM services for one of one-on-one and group communication. The IM server appliance includes an IM server for directing IM communication between the client systems and the public IM services, a message logging for creating a log entry of IM communications, a conferencing server interacting with the IM server to providing multiple user IM conferences, a web providing an administration interface and a plurality of public IM service gateways for translating messages from a native IM protocol employed within the IM appliance to a public IM protocol executing in any of the public IM services.

17 Claims, 6 Drawing Sheets

SELF-CONTAINED INSTANT MESSAGING APPLIANCE

CROSS-REFERENCE TO RELATED APPLICATION

This patent application claims the benefit of U.S. Provisional Patent Applications Ser. No. 60/482,663, entitled "SELF-CONTAINED INSTANT MESSAGING APPLIANCE", that was filed on Jun. 26, 2003, and 60/504,648, entitled "SYSTEM AND METHOD FOR CONTROLLING USER ACCESS TO A MESSAGING SYSTEM", that was filed on Sep. 19, 2003. The disclosures of these U.S. patent documents are incorporated by referenced in their entireties as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to digital communication systems and, more particularly, to a system, method and apparatus for facilitating instant messaging (IM).

2. Description of Prior Art

FIG. 1 illustrates a computer processing system 10, as is generally known in the art, for executing software applications that allow a user to perform tasks such as, for example, communicating with other computer users, accessing various computer resources, and viewing, creating, or otherwise manipulating electronic content such as, for example, any combination of text, images, movies, music or other sounds, animations, three-dimensional works of authorship, and links to other objects. The computer processing system 10 includes various input/output (I/O) devices such as, for example, a mouse 12, keyboard 14, display 16, and a general purpose computer 20 having a central processor unit (CPU) 22, an I/O unit 24 and a memory 26 for storing data and various software applications such as, for example, an operating system (O/S) 30 and one or more application programs (APP1-APP N) shown generally at 32. Typically, the computer 20 includes a communications card or device 40 such as, for example, a modem or network adapter, for exchanging data with a network shown generally at 50, via a communications link 42 such as, a telephone line. The computer processing system 10 may be a personal computer, laptop or work station as are known in the art.

Communication between computer processing systems is well known. Networks include two or more computer processing systems located in close physical proximity to many thousands of computer processing systems connected in a worldwide network. FIG. 2 is a simplified block diagram of a conventional computer processing network, shown generally at 100. The network 100 includes a plurality of client computer processing systems (Client 1-Client N), shown generally at 110 and configured in accordance with FIG. 1, coupled to a server 130 through a communication network 120 such as, for example, the Internet, an intranet or an extranet. Typically, a server is not a single entity (such as is shown at server 130 of FIG. 2), but is a network of interconnected server computers, in some embodiments physically dispersed from each other, each dedicated to a subset of duties and/or to a particular geographical region. In such a case, the individual servers are interconnected by a network of communication links, as is generally known in the art.

As shown in FIG. 2, a user of a client system 110 (e.g., Client 1) can access electronic content or other resources either stored locally at the user's own client system (e.g., in memory 26 of computer processing system 10) or remotely at one or more server systems 130. An example of a server system is a host computer that provides subscribers with varies forms of on-line services including digital communication. Users of a host computer's online services typically communicate with one or more central server systems 130 through client software executing on their respective client systems 110 (e.g., APP1 executing on computer processing system 10).

Different forms of digital communications have recently appeared. Examples of such digital communications includes bulletin board systems, chat rooms and instant messaging (IM). As known to those of skill in the art, the IM environment is defined in RFC 2778 and RFC 2779, which was published by the Internet Engineering Task Force (IETF) in Feb. of 2000, the disclosures of which are incorporated by reference herein in their entireties. The IM environment provides a medium in which digital communications occurs on a near real-time basis between a sender and a recipient, thereby permitting a sender to send and receive "instant" messages to and from a recipient.

IM is generally seen as a less formal method of communicating with individuals. IM capabilities are seen to be more flexible that communicating via the telephone and/or email. This added flexibility and informality, however, has lead to some concerns in certain areas of business. That is, certain business communication and decision making needs to be secure, monitored and/or archived for later reference by authorized persons such as, for example, regulators or auditors. For example, businesses within the financial industry are required to supervise and maintain records of contacts between their employees and consumers. The Securities and Exchange Commission (SEC) has promulgated regulations that guide the use of electronic media by brokers and dealers. It is generally believed that such regulations would apply within the IM environment. Additionally, businesses within the healthcare industry must comply with regulations promulgated under the Health Insurance Portability and Accountability Act of 1996 (HIPAA). Certain HIPAA regulations require security mechanisms to guard against unauthorized access to data that is transmitted over a communications network. It is generally believed that such regulations would apply within the IM environment.

To meet mandates established by these and other governmental regulations on communications, many corporations have struggled to adapt existing electronic communication systems facilitating IM with security, logging and other safeguards. The inventors have found many conventional systems deficient as they often require coordination of a number of individual systems to achieve all functions and capabilities required for a desired IM environment.

Accordingly, the inventors have realized that a need exists for a integrated, self-contained IM appliance as described herein.

SUMMARY OF THE INVENTION

The above and other objects are achieved by a system and method for providing an instant messaging (IM) environment as described herein. The network includes a plurality of client computer processing systems, a plurality of public IM services and an IM server appliance coupling the client computer systems and the public IM services for one of one-on-one and group communication. The IM server appliance includes an IM server for directing secured and/or unsecured IM communication between the client systems and the public IM services, message logging for creating a log entry of IM communications and reporting based thereon, a conferencing server interacting with the IM server to provide multiple user IM conferences, a web server providing an administration interface and a plurality of public IM service gateways for translating messages from a native IM protocol employed within the IM appliance to a public IM protocol executing in any of the public IM services.

The IM server appliance further includes integrated directory services providing information related to authorized users of the network. In one embodiment, the directory services are provided by a directory server included within the IM server appliance, e.g., wherein the directory server is coupled to and interacts with the IM server. In another embodiment, the directory services are provided by an external directory server hosted in a system employing the IM appliance to provide the IM environment. In this embodiment, the directory services includes capabilities for synchronizing the integrated directory services structure of the IM server appliance with the external directory server.

The IM server appliance also includes access control lists for selectively providing client computer processing systems access to the plurality of public IM services on at least one of a group and per-user basis.

BRIEF DESCRIPTION OF THE DRAWINGS

The features and advantages of the present invention will be better understood when the Detailed Description of the Preferred Embodiments given below is considered in conjunction with the figures provided, wherein.

In these figures, like structures are assigned like reference numerals, but may not be referenced in the description for all figures.

DETAILED DESCRIPTION OF THE PREFERRED EMBODIMENTS

Figure 1:
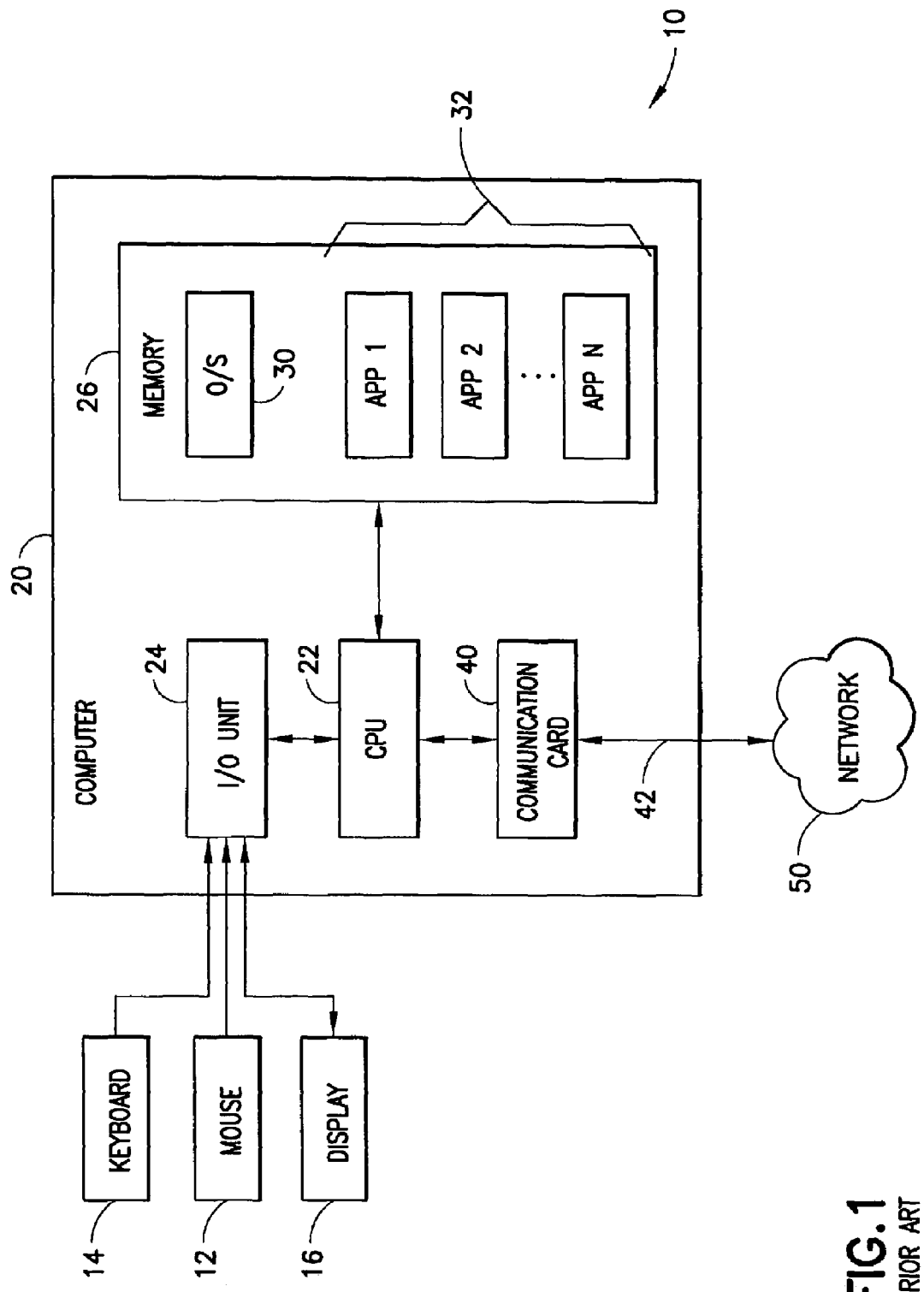
FIG. 1 is a block diagram of a conventional computer processing system.
Figure 2:
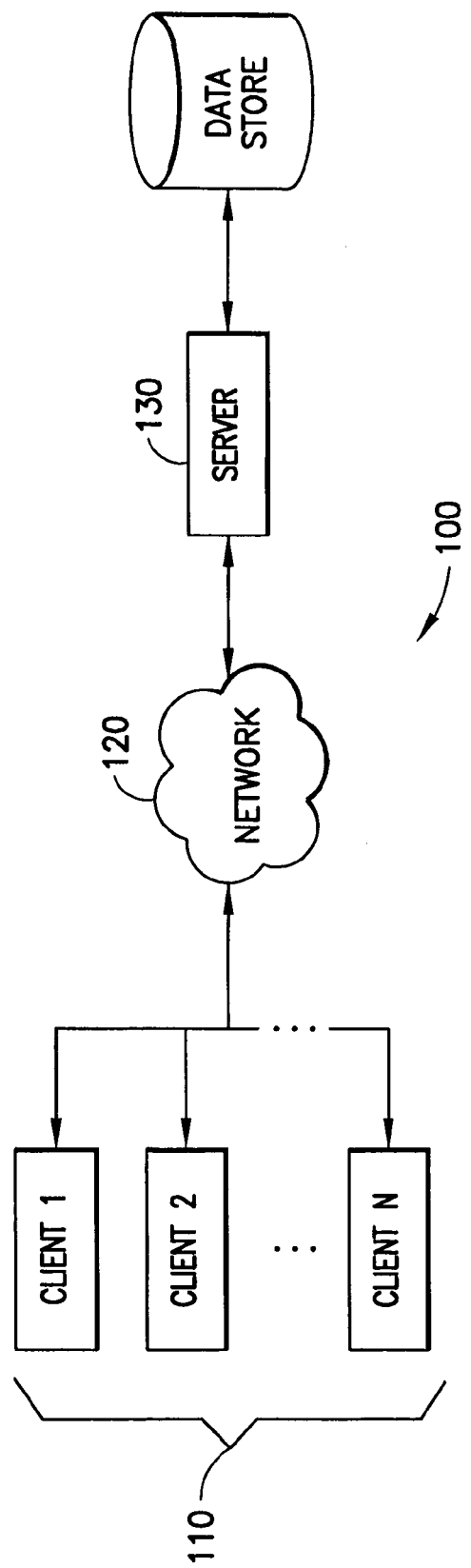
FIG. 2 is a block diagram of a conventional computer processing network.
Figure 3:
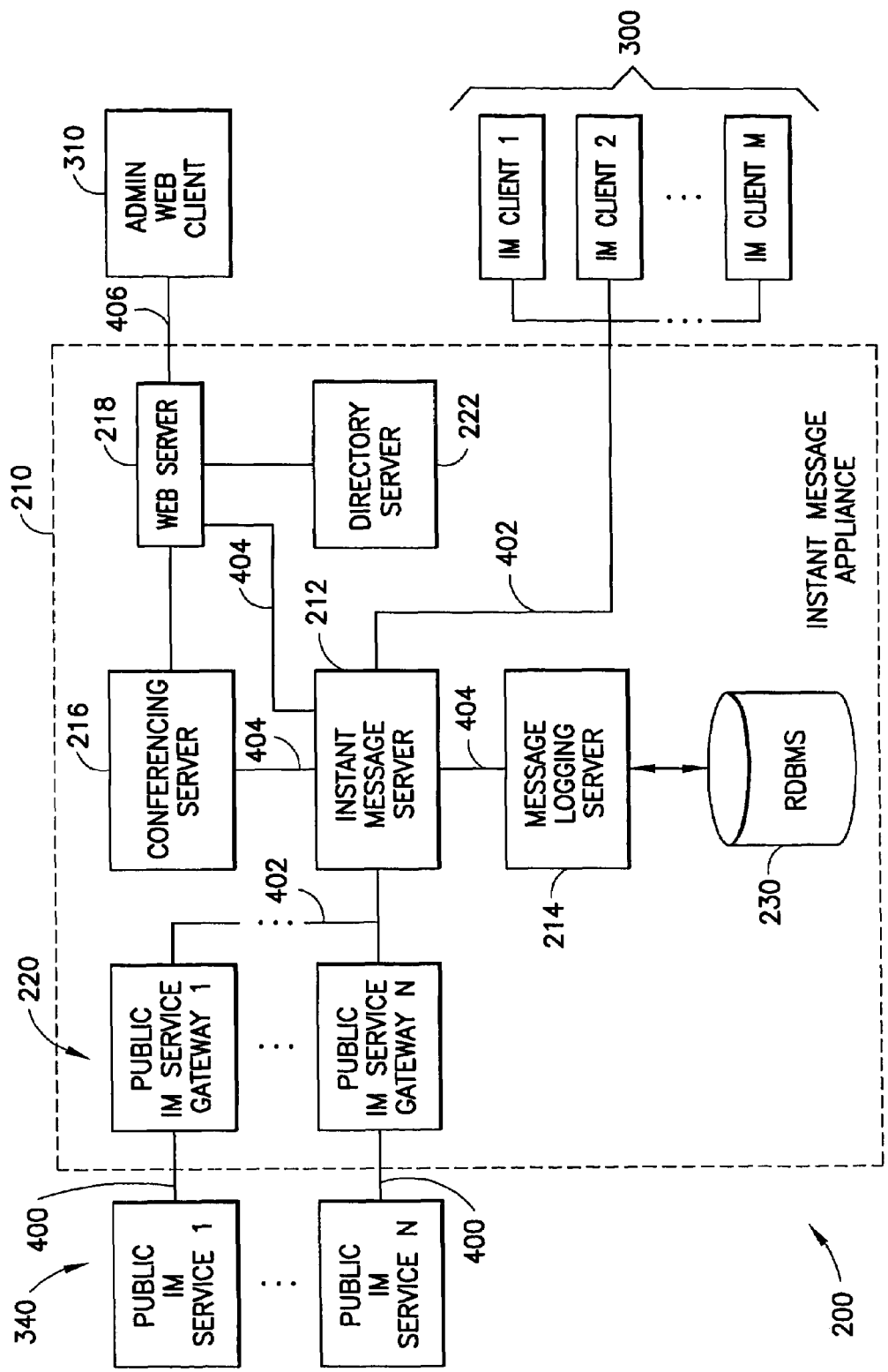
FIG. 3 is a simplified block diagram of a computer processing network constructed and operating for implementing an IM environment in accordance with one embodiment of the present invention.

FIG. 3 is a simplified block diagram of a computer processing network 200 configured and operating in accordance with one embodiment of the present invention to implement techniques, as described herein, for facilitating an IM environment. As illustrated in FIG. 3, the network 200 includes an integrated IM server appliance 210 having hardware and/or software components, described below, providing secured and/or unsecured IM communication between computer users operating a plurality of client computer processing systems shown generally at 300 and a plurality of public IM services shown generally at 340 (executing message-handling IM client applications such as, for example, America Online Inc.'s Instant Messenger, Microsoft Corporation's MSN, Yahoo! Inc.'s Instant Messenger or the like) coupled to the network 200 over wired or wireless communication connections for one-on-one communication (e.g., private conversations) or as a group in a virtual conference room (e.g., available to all users of the network 200 or a predetermined group of users). The IM server appliance 210 may perform as one or more servers and may include (in a single unit of hardware), multiple pre-configured software applications, which may include all components necessary for providing a complete and secure IM environment.

In one embodiment, as illustrated in FIG. 3, the IM server appliance 210 includes an IM server 212 connected to a message logging server 214, a conferencing server 216, a web server 218 and a plurality of public IM service gateways shown generally at 220. The IM server 212 directs all IM communication between the plurality of client computer processing systems 300 and the plurality of public IM services 340 (e.g., through the plurality of public IM service gateways 220). In one embodiment, the IM server 212 is based on an open source Jabber server using an open communication protocol such as, for example, XMPP. The message logging server 214 is connected to a data store such as, for example, a database management system (DBMS) 230. Preferably, the DBMS 230 is structured as a relational data base management system. The message logging server 214 creates a log entry of all IM communication and stores that entry in the DBMS 230. In one embodiment, the log entry includes, for example, unique client computer user names (e.g., of the sending and receiving parties), location of user (e.g., respective IP addresses), date and time the IM was sent, status of message (e.g., read, unread, and the like). In one embodiment, files transferred between users are also stored in the DBMS 230. In one embodiment, the data transferred is stored in the DBMS 230 and, in another embodiment, the file name and location of the file is stored. It should be appreciated that the DBMS 230 may be implemented as, for example, a server of the Oracle Corporation, a MySQL or PostgreSQL database solution or the like.

It should be appreciated that log entries created and stored by the message logging server 214 and DBMS 230 are utilized to provide reporting features. For example, administrators of the IM appliance 210 may query the log entries to gather and track statistics regarding IM communication such as, for example, number of messages/chats sent and received through out the network and/or by individual users or groups of users, status of messages (e.g., number of messages unread), and the like.

In accordance with well known principles, the IM server 212 and the conferencing server 216 interact to permit multiple user IM conferences.

In accordance with the present invention, the IM server appliance 210 permits the transfer of an IM message from a first recipient user to a second recipient (e.g., a third party such as a transfer from an administrative assistant to an executive). Generally speaking, the transfer function is similar to transferring a conventional telephone phone call.

In one embodiment, the transfer is accomplished when the first recipient user receives a message composed by a sender and initiates a message (e.g., including the IM message from the sender) to the second recipient. The second recipient receives the message and the session continues between the original sender and the second recipient. In one embodiment, the sender of the original message is notified of the transfer of the IM message. Preferably, the transfer occurs without requiring the original sender to perform any additional action. In one embodiment, the first recipient transfers a received message to another IM or IP address of the first recipient. For example, the first recipient may be concurrently logged in on more than one device (e.g., a work station that received the IM message and a portable electronic device such as a laptop computing device, personal digital assistant (PDA), cellular telephone or the like) and prefer to conduct and/or continue the IM chat at the device that did not originally receive the IM message. In accordance with the present invention, the first recipient may transfer the IM message to the second device. In one embodiment, the IM chat may be automatically transferred in response to a user-defined setting.

User information (e.g., unique user identification, information related to uses by IM clients, and other user account information) may be stored in an integrated directory structure such as, for example, a Lightweight Directory Access Protocol (LDAP) compliant directory, as is known in the art, accessible by means of a directory server 222.

In one embodiment, the directory server 222 accesses user information stored in a directory structure hosted on a different system, where the different system employs the IM appliance 210 to provide its IM environment. In this regard, the directory server 222 includes capabilities for synchronizing its integrated directory structure with an external directory. Preferably, the external directory is LDAP compliant.

In one embodiment, message and presence information are archived in an integrated relational database management system (not shown) accessible by means of the directory server 222. In one embodiment, the directory server 222 may be implemented as an OpenLDAP, Microsoft Active Directory, Netscape Directory server, or the like.

The web server 218 manages an administration interface for users as well as controlling components of the appliance according to administration settings (e.g., Appache web server, Microsoft IIS, Netscape Enterprise Server, etc.). A web client computer processing system 310, which may be used to register with the IM appliance 210 via the web server 218, may utilize any conventional web browser such as, for example, Microsoft Explorer, Netscape Navigator, and the like, and may be used to administer and control settings within the IM appliance 210.

Figure 5:
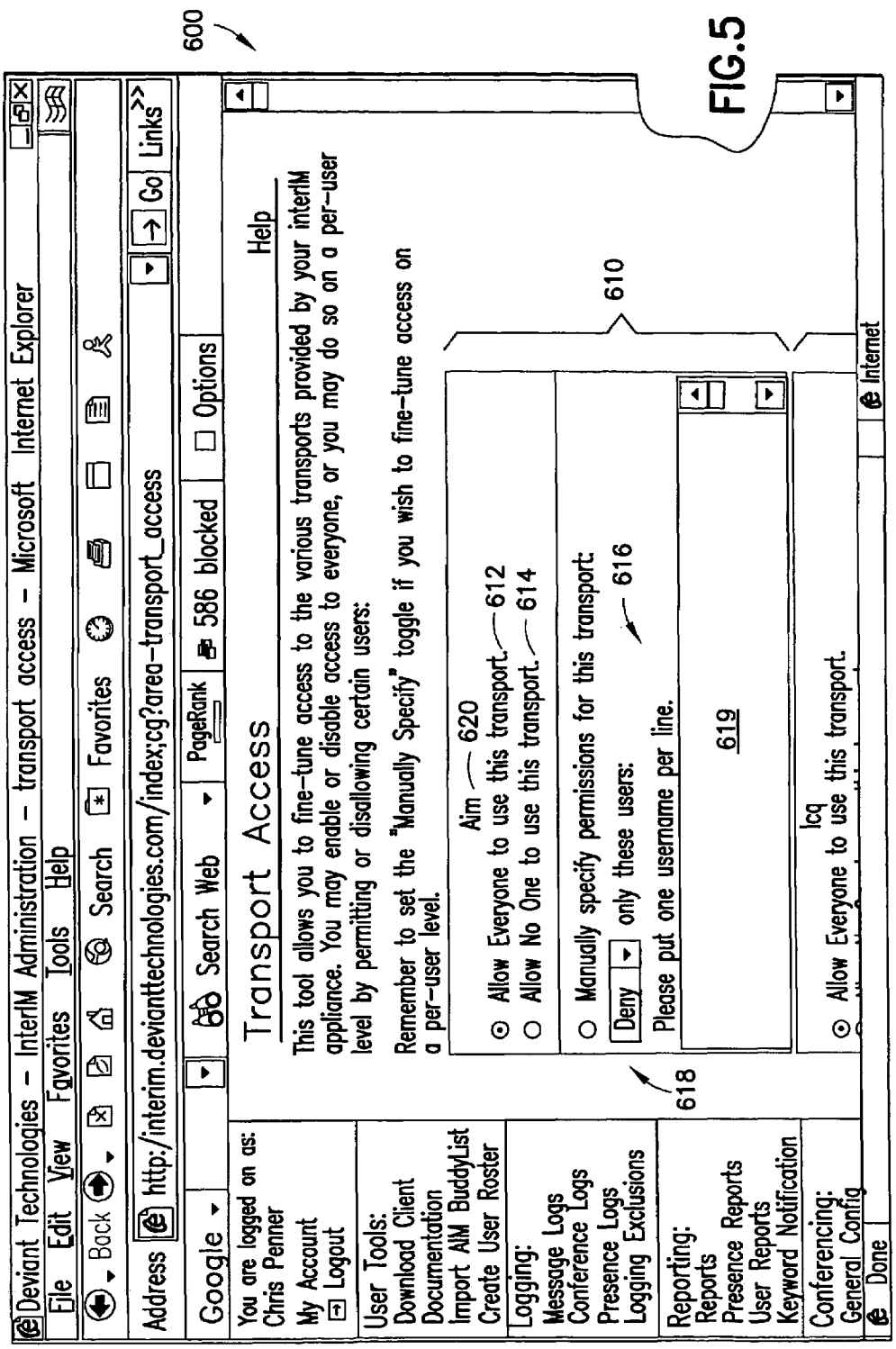
FIGS. 5 and 6 illustrate graphical user interfaces depicting some features and functions of the software modules of one embodiment of the present invention.

In one embodiment, illustrated in FIG. 5, an administrator utilizes a graphical user interface 600 to define access privileges 610 to a transport, e.g., one of the public IM services 340 such as an AIM transport 620. As shown in FIG. 5, access privileges 610 include, for example, an option 612 to allow all users access to the subject transport (e.g., the AIM transport 620), an option 614 to deny all users access to the subject transport, and a manual option 616 to allow or deny (by use of a dropdown box setting 618) access to the subject transport on a per-user basis. In one embodiment, the per-user access is set by specifying user names within a list box 619 provided on the graphical user interface 600.

Figure 6:
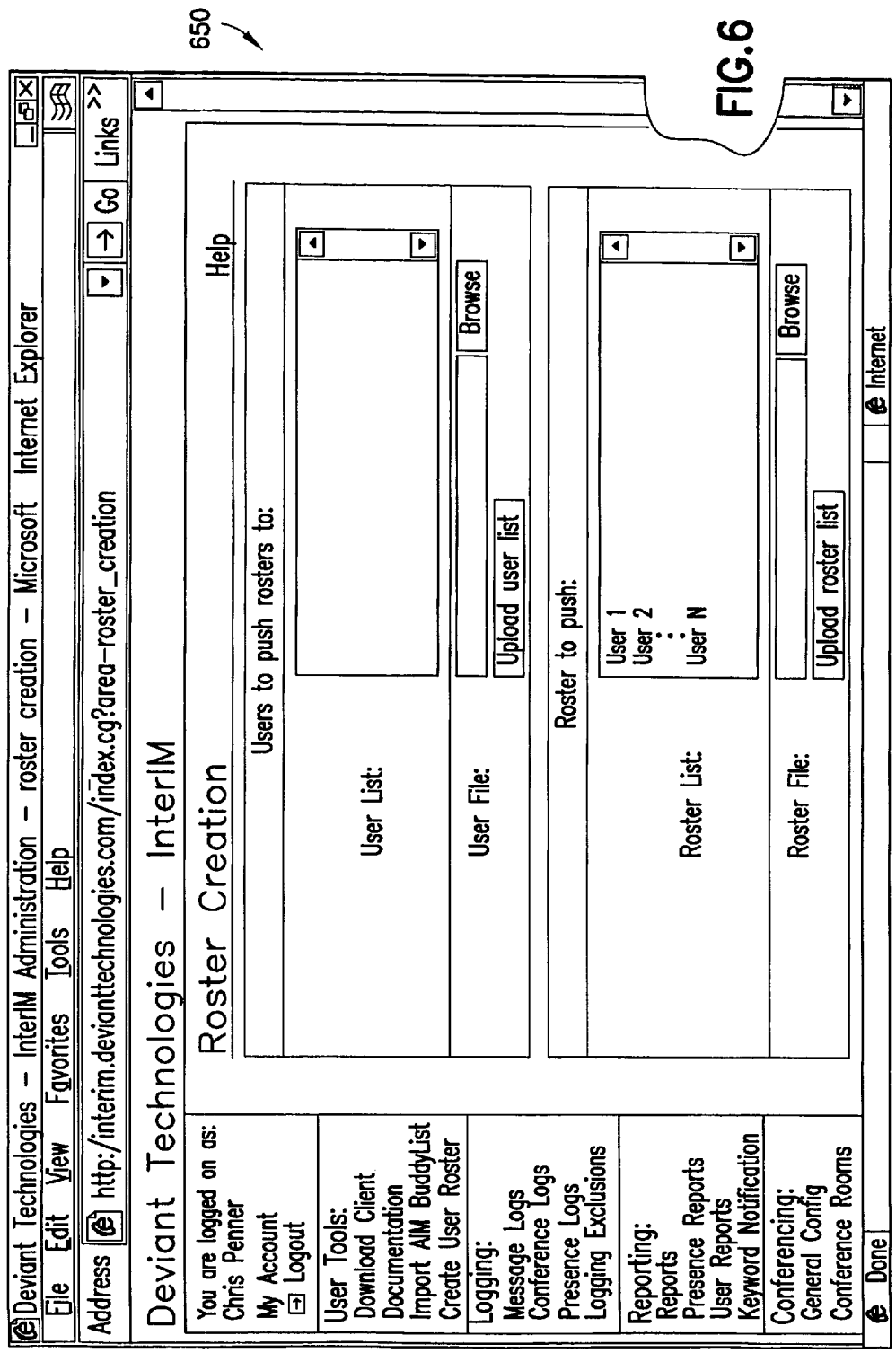

FIG. 6 depicts a Roster Creation graphical user interface 650 of the present invention. The Roster Creation interface 650 is an administrative tool that allows an administrator of the IM appliance 210 to "push" a roster (e.g., an IM Contact list) down to an end user. The roster reside on the IM server 212, and appear on the user's client application as the user logs into the system. In one embodiment, for example, the Roster Creation tool 650 is used to establish a contact list for a new employee so that when the employee starts their job tasks they log on and are provided contact lists that include other members of, for example, their department, team and the like, without having to add these people manually as they meet these members. It should be appreciated that a roster may include individual users as well as groups of users.

The public IM service gateways 220 interact with public IM services 340, and translate messages from a native IM protocol employed within the IM appliance 210 to a public IM protocol such as, for example, the aforementioned IM client services, America Online Inc.'s Instant Messenger, Microsoft Corporation's MSN, or Yahoo! Inc.'s Instant Messenger executing conventional message protocols such as Jabber, SIP/Simple, and SMS. The native IM protocol may be downloaded by the IM clients 300 from the IM appliance 210 once a user has registered with the system 200. An IM client application (e.g., the native IM protocol) enables users of the IM clients 300 to send and receive messages. In one embodiment, communications between the IM clients 300 and the IM server appliance 210 (and/or the public IM services 340) may be encrypted.

As described in detail below, it is within the scope of the present to include an ability to manage access to the public IM transports (e.g., the public IM services 340) in at least one of a user and/or a group level. In conventional systems, administration of public IM transports is limited to full enablement or disablement, meaning that either the entire user population has access to a public IM service transport or everyone is forbidden access to the same. In the present invention, administrators (e.g., via the administration web client 310 and web server 218) may grant and/or deny access to public IM transports to individual user, a subset of users and/or to the entire population of users. In one embodiment, access as described above is accomplished by implementing access control lists in the protocol translation performed in the public IM service gateways 220.

Communication within the computer processing network 200 is as follows. Communications 400 between the public IM services 340 and the IM service gateways 220 are conducted using a public IM services and protocols such as, for example, America Online Inc.'s Instant Messenger, Microsoft Corporation's MSN, Yahoo! Inc.'s Instant Messenger, or the like. Communications 402 between the IM service gateways 220 and the IM server 212, and/or the IM clients 300 are conducted using a native IM protocol, which may be proprietary or an open standard such as, for example, Jabber, XMPP as are generally known. Messages travel in an XML packet from clients 300 to the server 212. The server 212 examines the packet and routes it to the intended recipient, e.g., another client 300 or one of the public IM services 340. In one embodiment, the communications 402 are encrypted to prevent access from users outside the IM appliance 210. Communications 404 between the IM server 212, the message logging server 214 the conferencing server 216 and the web server are inter-process communications utilizing, for example, shared memory, pipes, and the like. Communications 406 between the web server 218 and the administration web client 310 is conducted using, for example, a HTTP protocol for secure web access.

Figure 4:
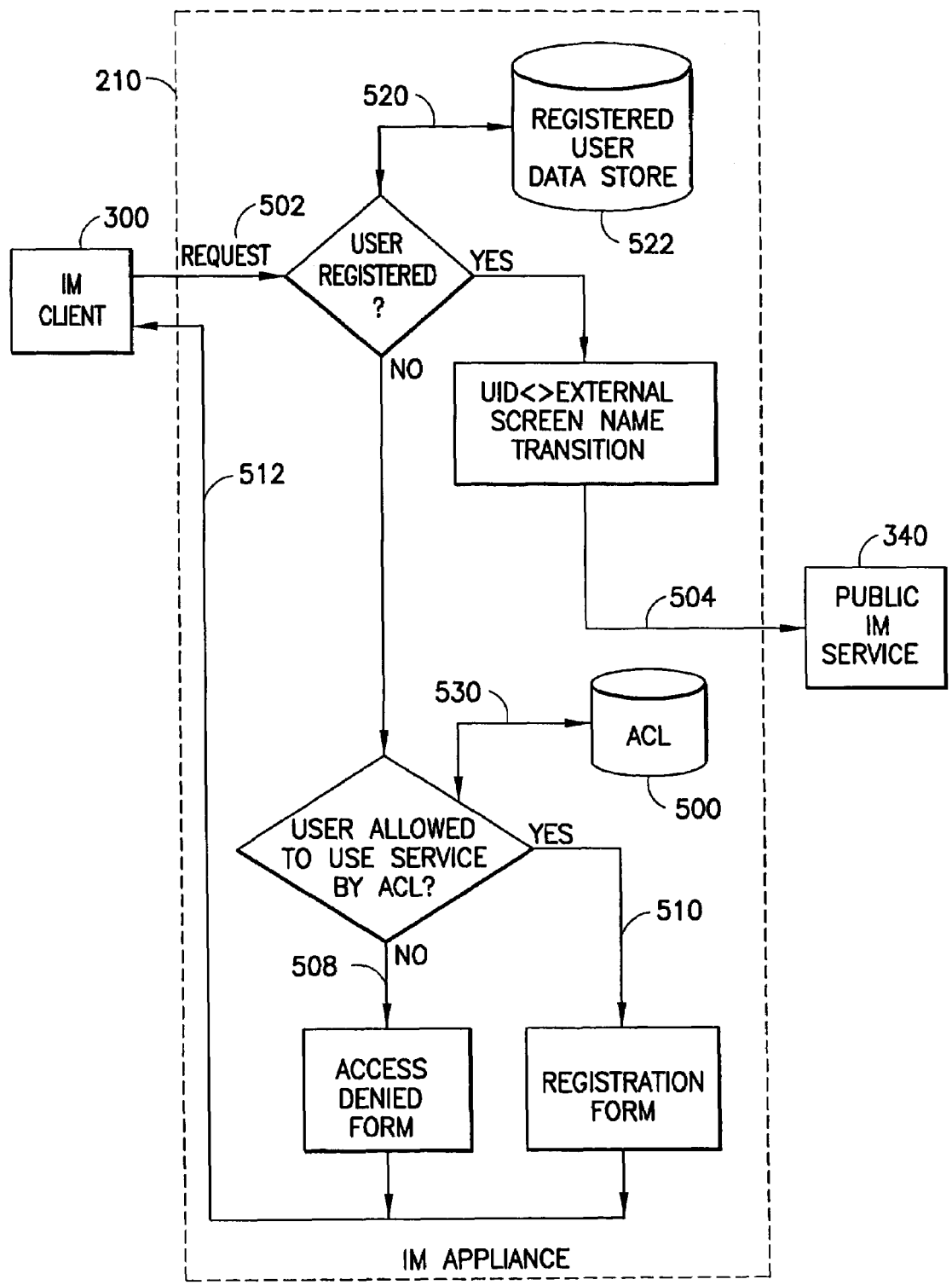
FIG. 4 is a flow diagram illustrating transport access control in accordance with one embodiment of the present invention.

In one embodiment of the present invention, controlling access to transports (e.g., public IM services 340) on a selective basis (e.g., per-user basis) includes a two-part solution. As illustrated in FIG. 4, the IM appliance 210 includes an access control list (ACL) 500 defining and storing a list of registered users (e.g., registered users being included in a data store 522 monitored by the directory server 222) that are permitted (e.g., given a privilege) to access one or more of the plurality of public IM services 340 coupled to the IM appliance 210 via the plurality of public IM service gateways 220. In one embodiment, the ACL 500 includes registered users that are not permitted access to a public IM service 340, which by implication means that all other registered users would have access to the corresponding public IM service. The IM appliance 210 also includes mechanisms 520 and 530, described below, for enforcing the set of access restrictions included within the ACL 500 and registered user data store 522.

In one embodiment, the ACL 500 comprises a database (e.g., implemented in XML) with data entries corresponding to each transport (e.g., each of the plurality of public IM services 340), respective registered users, and an access indicator (e.g., noting whether access should be allowed or denied).

In one embodiment of the present invention, the IM appliance 210 includes query mechanisms 520 and 530 for invoking the registered user data store 522 and the ACL 500 for determining whether access to a public transport is granted (returns a "true" or "yes" value) or denied (returns a "false" or "no" value). For example, and as illustrated in FIG. 4, an IM client 300 requests 502 that the IM appliance 210 grants access to a public IM service 340. The IM appliance 210 invokes the query mechanism 520 to determine whether the user is registered at the requested IM service 340. If the user is registered (e.g., the query 520 returns a "yes" value), access is granted to the Public IM service along path 504. If the user is not registered (e.g., the query returns a "no" value), control passes along path 506 where the IM appliance 210 invokes the ACL query mechanism 530. In one embodiment, the a transport name and user name (e.g., specific one of the public IM services 340 and registered user identifier) is provided to the query mechanism 530 which returns an indication as to whether access is granted or denied. If access is denied (query 530 returns a "no" value), control passes along paths 508 and 512 where an "access denied" message is provided to the requesting IM client 300. If access is granted (query 530 returns a "yes" value), control passes along paths 510 and 512 where a registration form is provided to the requesting IM client 300 for completion. Once the registration form is provided by the IM client, an entry is made within the registered user data store 522 and the requesting client 300 is provided access to the public IM service 340 along path 504 as described above.

It should be appreciated that in accordance with one aspect of the present invention the ACL query 530 includes a policy set that is enforced by means of the ACL list 500 accessed directly within the transport. Accordingly, in one embodiment of the present invention, a determination is made as to whether or not a user has access to register with the transport using a querying mechanism (e.g., mechanism 530) of the ACL. If the user has access, registration proceeds as usual. However, if the user does not have access, then a standard registration form (which the end user client expects to be present, therefore not allowing the request to be ignored) is altered into an "access denied" message box and information the user then tries to submit to or sent through the transport is dropped. An advantage to accessing the ACL list 500 at the registration phase, as opposed to attempting a proxy-like setup where all traffic is evaluated on a per-packet basis, is that system load and/or network overhead are significantly decreased. Moreover, embodiments of the present invention make for an extremely efficient, effective, and innovative way to accomplish access control to transports on a per-user basis.

For example, the ACL lists 500 allows system administrators the ability to implement, on a per-user basis, a policy for accessing IM transports (e.g., one or more of the public IM services 340. Once the policy is established, policy violators (e.g., users attempting or gaining access to unauthorized IM transports) are denied access to the one or more transports. Accordingly, the ACL lists 500 allows the system administrator to prohibit future access to persons deemed a potential problem.

Some features/benefits of the integrated IM server appliance 210 include, for example:

Appliance format: Software integration is complete, no integration required by the user;

Appliance format: the IM server 212, directory server 222, database 230, public network access 220 and 340, keyword tools, reporting, roster management, encryption, firewall, IM client, and administrative tools are all integrated on a single server;

Integrated reporting: report on user, group, or corporate usage statistics;

2048 bit encryption: send messages securely;

Built in firewall to protect the hardware from unauthorized intrusion;

LDAP directory, for synchronization and full featured user administration;

Compatible with public IM services such as, for example, America On-Line, Yahoo! Inc., Microsoft Network (MSN), and ICQ instant messengers;

Control access to public IM service 340 on all users, user group and a per-user basis; and Create and push user rosters to IM clients 300.

Additional features/benefits of the integrated IM server appliance 210 include, for example:

Rapid installation and easy administration saves administrators time on installation and maintenance;

All services are provided by a single vendor reducing vendor complexity; and

All required IM software is bundled on the appliance, allowing reduced initial and long-term maintenance costs.

Although described in the context of preferred embodiments, it should be realized that a number of modifications to these teachings may occur to one skilled in the art. While the invention has been particularly shown and described with respect to preferred embodiments thereof, it will be understood by those skilled in the art that changes in form and details may be made therein without departing from the scope and spirit of the invention.

What is claimed is:

1. A computer processing network for providing an instant messaging (IM) environment, said network comprising:

a plurality of client computer processing systems enabled to send and receive IM communications;

connectivity to a plurality of public IM services, said public IM services being remote from said client computer processing systems and being independently configured to enable alternative IM capabilities for exchanges of said IM communications with respect to said client computer processing systems, said plurality of public IM services using a plurality of different public IM protocols for exchanging IM messages; and an IM server appliance remote from but operatively coupling said plurality of client computer processing systems to said plurality of public IM services for at least one of one-on-one and group communication, wherein said IM server appliance includes:

an IM server for directing said IM communications between said plurality of client computer processing systems and said plurality of public IM services;

a message logging server coupled to said IM server, said message logging server creating a log entry of said IM communications and storing said entry in a data store coupled thereto; and a plurality of public IM service gateways coupled to said IM server and said public IM services, said public IM service gateways translating messages from a native IM protocol employed within said IM server appliance to a public IM protocol executing on said public IM services, wherein said public IM service gateways are configured to conduct said IM communications with said public IM services using said different public IM protocols and to conduct said IM communications with said IM server using said native IM protocol, such that said IM server directs said IM communications to said client computer processing systems employing said native IM protocol.

2. The computer processing network of claim 1, wherein said data store is comprised of a data base management system.

3. The computer processing network of claim 2, wherein said data base management system is a relational data base management system.

4. The computer processing network of claim 1, wherein said log entry includes unique client computer user names of the sending and receiving parties, a location of each user in terms of their respective IP addresses, a date and a time an IM message was sent, and a status of said sent IM message.

5. The computer processing network of claim 4, further including reporting features for querying said log entries to gather, track and report statistics regarding IM communication within said network.

6. The computer processing network of claim 5, wherein said statistical reports include (a) a number of messages/chats sent and received throughout said network or by individual users and groups of users and (b) a number of messages by message status.

7. The computer processing network of claim 1, further including integrated directory services providing information related to authorized users of the network.

8. The computer processing network of claim 7, wherein said directory services are provided by a directory server included within said IM server appliance, said directory server coupled to and interacting with said IM server.

9. The computer processing network of claim 7, wherein said directory services are provided by an external directory server hosted in a system employing said IM appliance to provide said IM environment, and wherein said directory services include capabilities for synchronizing said integrated directory services structure with said external directory server.

10. The computer processing network of claim 1, wherein said IM server appliance further includes access control lists for selectively providing said client computer processing systems access to said plurality of public IM services on a per-user basis, at least some of said public IM services using IM protocols which are proprietary.

11. The computer processing network of claim 10, wherein said access control lists include data entries corresponding to each of said plurality of public IM services, respective registered users, and an access indicator representative of whether said respective user's access is one of allowed or denied to a public IM service.

12. The computer processing network of claim 1, wherein said IM server appliance further includes a conferencing server coupled to and interacting with said IM server for providing multiple user IM conferences.

13. The computer processing network of claim 1, wherein said IM server appliance further includes a web server coupled to said IM server, said web server providing an administration interface for controlling components of said server appliance in accordance with administration settings.

14. The computer processing network of claim 1, wherein said IM server includes logic for receiving an IM message from a sender to a first recipient and for transferring said received IM message from said first recipient to a second recipient.

15. The computer processing network of claim 1, wherein said IM server includes logic for receiving an IM message from a sender to a first recipient and for transferring said received IM message from a first IM address of said first recipient to a second IM address of said first recipient that is different from said first IM address.

16. The computer processing network of claim 1, wherein said IM server includes logic for receiving an IM message from a sender to a first recipient and for transferring said received IM message from a first IP address of a first computing device of said first recipient to a second IP address of a second computing device of said first recipient that is different from said first IP address and said first computing device.

17. A computer processing network for providing an instant messaging (IM) environment, said network comprising:

a plurality of client computer processing systems enabled to send and receive IM communications;

connectivity to a plurality of public IM services, said public IM services being remote from said client computer processing systems and being independently configured to enable alternative IM capabilities for exchanges of said IM communications with respect to said client computer processing systems, said plurality of public IM services using a plurality of different public IM protocols for exchanging IM messages; and an IM server appliance remote from but operatively coupling said plurality of client computer systems to said plurality of public IM services for at least one of one-on-one and group communication, wherein said IM server appliance includes:

an IM server for directing said IM communications between said plurality of client computer processing systems and said plurality of public IM services;

a message logging server coupled to said IM server, said message logging server creating a log entry of IM communications and storing said entry in a data store coupled thereto;

a conferencing server coupled to and interacting with said IM server for providing multiple user IM conferences;

a web server coupled to said IM server, said web server providing an administration interface for controlling components of said server appliance in accordance with administration settings; and a plurality of public IM service gateways coupled to said IM server and said public IM services, said public IM service gateways translating messages from a native IM protocol employed within said IM appliance to a public IM protocol executing on said public IM services, wherein said public IM service gateways are configured to conduct said IM communications with said public IM services using said different public IM protocols and to conduct said IM communications with said IM server using said native IM protocol, such that said IM server directs said IM communications to said client computer processing systems employing said native IM protocol.

\* \* \* \* \*